(No Model.)
R. REACH.
SKATE WHEEL.
No. 565,795. Patented Aug. 11, 1896.
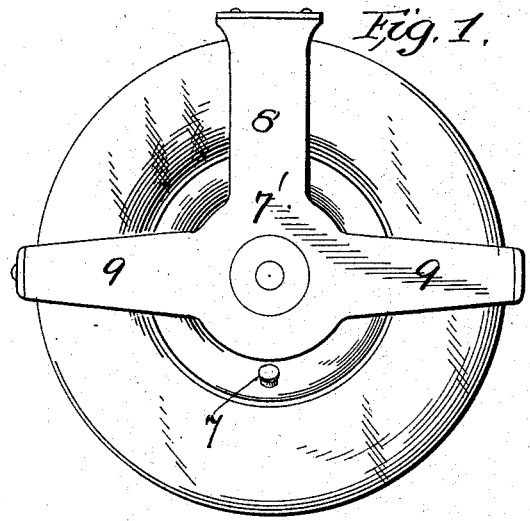
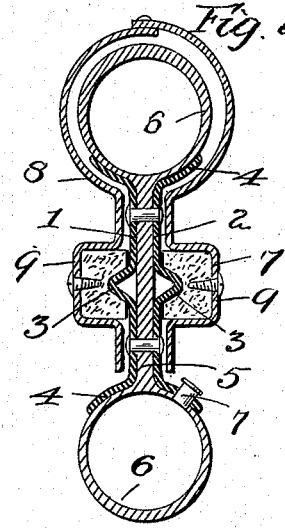
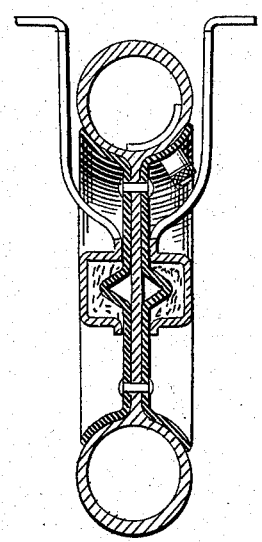
Attest
Walter Donaldson
R. E. Ourand
Inventor
Robert Reach
by Ellis Spear
Atty.

UNITED STATES PATENT OFFICE.

ROBERT REACH, OF PHILADELPHIA, PENNSYLVANIA.

SKATE-WHEEL.

SPECIFICATION forming part of Letters Patent No. 565,795, dated August 11, 1896.

Application filed May 17, 1896. Serial No. 549,617. (No model.)

*To all whom it may concern:*

Be it known that I, ROBERT REACH, a citizen of the United States, residing at Philadelphia, in the county of Philadelphia and State of Pennsylvania, have invented certain new and useful Improvements in Skate-Wheels, of which the following is a specification, reference being had therein to the accompanying drawings.

It is the object of my invention to provide a wheel or roller for a roller-skate which may be attached to any ordinary skate-frame.

My invention comprises a tire with its web, body-sections clamped on each side thereof and carrying their own journal-pins projecting therefrom, and a frame having sockets to receive the said journals.

My invention comprises other features hereinafter described.

My invention also includes details of construction hereinafter pointed out.

In the drawings, Figure 1 is a side view of the wheel and support, and Fig. 2 is a horizontal sectional view. Fig. 3 is a vertical sectional view of the invention.

The body of the wheel consists of the two sheet-metal sections 1 2, each having a conical bearing-point 3 struck up therefrom, and also a peripheral flange 4, curved and bent laterally. These sections are clamped together by rivets or other fastening means, and interposed between these sections is the web or rubber disk 5, which is securely held in place by the clamped sections. This web is formed or cast with the tire portion 6, which is round or cylindrical in cross-section. In Fig. 2 I show the tire as hollow, with a suitable valve 7, so that the tire may be inflated and thus a pneumatic tire provided for the wheel. The tire and the flanges of the body-sections conform to each other, thus securing a firm bearing between these parts. The tire being formed, as stated, integral with the web, is held not only by the flanges of the felly, but also by the web, to which it is attached.

I do not wish to limit myself to a pneumatic tire as formed with the web, as instead of a hollow tire I may use a solid tire. The wheel is journaled in the wheel-frame 7', composed of two sections, each of which is made up of vertical arms 8 and horizontal arms 9. The arms are turned over the tire and are lapped and riveted together. Each section has a socket in it filled with a fiber bushing, forming a bearing for the wheel-pintles. This frame may be attached to any ordinary skate-body.

I claim—

1. In combination, the body formed of sections with integral conical journals at their central portions having their apices directed outwardly, the tire having the web extending between the two sections, means for clamping the sections together and for holding the web, and the supporting-frame having the sockets to receive the conical journals of the body-sections, substantially as described.

2. A wheel comprising a tire having a solid web-center reaching entirely across from side to side of the tire, and the body formed of sections clamped on each side of the solid web and having felly portions to receive the tire, substantially as described.

3. A wheel comprising a tire having a solid web-center, the body portion made up of sections clamped to the solid web-center, having felly portions and each section having its own journal-pin projecting outwardly therefrom and the frame having sockets to receive the said journals, substantially as described.

4. In combination, the tire with its web, the body-sections clamped on each side thereof and having conical journal-pins struck up therefrom and the frame having sockets to receive the journal-pins, substantially as described.

In testimony whereof I affix my signature in presence of two witnesses.

ROBERT REACH.

Witnesses:
JONATHAN BARNES,
WALTER S. ROBINSON.